US007239422B2

(12) United States Patent
Braun et al.

(10) Patent No.: US 7,239,422 B2
(45) Date of Patent: Jul. 3, 2007

(54) COLOR GAMUT MAPPING USING A COST FUNCTION

(75) Inventors: Gustav Braun, Fairport, NY (US); Douglas W. Couwenhoven, Fairport, NY (US); Kevin E. Spaulding, Spencerport, NY (US); Geoffrey J. Woolfe, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1034 days.

(21) Appl. No.: 10/310,009

(22) Filed: Dec. 4, 2002

(65) Prior Publication Data

US 2004/0109180 A1    Jun. 10, 2004

(51) Int. Cl.
G06F 15/00 (2006.01)
G03F 3/08 (2006.01)
G06K 9/00 (2006.01)

(52) U.S. Cl. .......................... 358/1.9; 358/518; 382/167
(58) Field of Classification Search ................. 358/1.9, 358/518, 504, 3.26, 501, 520, 535, 529; 382/162, 167, 165, 166; 347/3, 43
See application file for complete search history.

(56) References Cited

U.S. PATENT DOCUMENTS

| | | | |
|---|---|---|---|
| 3,825,673 A * | 7/1974 | Furrey et al. ................ 348/652 |
| 4,482,917 A | 11/1984 | Gaulke et al. | |
| 4,930,018 A | 5/1990 | Chan et al. | |
| 4,992,861 A | 2/1991 | D'Errico | |
| 5,012,257 A | 4/1991 | Lowe et al. | |
| 5,185,661 A * | 2/1993 | Ng .............................. 358/505 |
| 5,425,134 A | 6/1995 | Ishida | |
| 5,438,649 A * | 8/1995 | Ruetz .......................... 358/1.9 |
| 5,508,827 A | 4/1996 | Po-Chieh | |
| 5,515,479 A | 5/1996 | Klassen | |
| 5,553,199 A | 9/1996 | Spaulding et al. | |
| 5,563,985 A | 10/1996 | Klassen et al. | |
| 5,583,666 A * | 12/1996 | Ellson et al. ................ 358/518 |
| 5,633,662 A | 5/1997 | Allen et al. | |
| 5,710,824 A | 1/1998 | Mongeon | |
| 5,721,572 A | 2/1998 | Wan et al. | |
| 5,822,451 A | 10/1998 | Spaulding et al. | |
| 5,878,195 A * | 3/1999 | Mahy .......................... 358/1.9 |
| 5,937,104 A * | 8/1999 | Henderson et al. ......... 382/279 |
| 5,975,671 A * | 11/1999 | Spaulding et al. ............. 347/15 |
| 5,991,511 A * | 11/1999 | Granger ....................... 358/1.9 |
| 6,081,340 A | 6/2000 | Klassen | |
| 6,266,165 B1 * | 7/2001 | Huang et al. ................ 358/520 |
| 6,312,101 B1 | 11/2001 | Couwenhoven et al. | |
| 6,435,657 B1 * | 8/2002 | Couwenhoven et al. ...... 347/43 |
| 6,483,875 B1 * | 11/2002 | Hasebe et al. ......... 375/240.15 |
| 6,724,507 B1 * | 4/2004 | Ikegami et al. ............. 358/518 |
| 6,750,992 B1 * | 6/2004 | Holub ........................ 358/504 |
| 6,774,953 B2 * | 8/2004 | Champion et al. .......... 348/651 |

(Continued)

Primary Examiner—Madeleine A V Nguyen
(74) Attorney, Agent, or Firm—Raymond L. Owens

(57) ABSTRACT

A method of generating a reduced color gamut boundary for a color output device using three or more colorants, wherein the amount of each colorant is controlled by a colorant control signal vector, including determining a forward device model for the color output device relating the colorant control signal vector to the corresponding output color; determining a complete color gamut boundary for the color output device, comprising a set of color gamut boundary points; and determining a set of candidate colorant control signal vectors for each point in the complete color gamut boundary. The method also includes selecting a preferred colorant control signal vector.

16 Claims, 7 Drawing Sheets

U.S. PATENT DOCUMENTS

| | | | |
|---|---|---|---|
| 6,833,937 B1 * | 12/2004 | Cholewo | 358/518 |
| 6,847,737 B1 * | 1/2005 | Kouri et al. | 382/260 |
| 6,882,445 B1 * | 4/2005 | Takahashi et al. | 358/1.9 |
| 7,064,869 B2 * | 6/2006 | Spaulding et al. | 358/3.1 |
| 7,097,311 B2 * | 8/2006 | Jaynes et al. | 353/122 |
| 2002/0000993 A1 * | 1/2002 | Deishi et al. | 345/590 |
| 2003/0016305 A1 * | 1/2003 | Champion et al. | 348/649 |
| 2004/0027465 A1 * | 2/2004 | Smith et al. | 348/231.3 |
| 2004/0071363 A1 * | 4/2004 | Kouri et al. | 382/276 |
| 2004/0109180 A1 * | 6/2004 | Braun et al. | 358/1.9 |

* cited by examiner

COLOR GAMUT MAPPING USING A COST FUNCTION

CROSS REFERENCE TO RELATED APPLICATIONS

Reference is made to commonly assigned U.S. patent application Ser. No. 09/881,460 filed Jun. 14, 2001 by Douglas Couwenhoven et al., entitled "Method for Multilevel Printing of Digital Images Using Reduced Colorant Amounts", and commonly assigned U.S. patent application Ser. No. 10/309,866 filed concurrently herewith by Douglas W. Couwenhoven et al., entitled "Calibrating a Digital Printer Using a Cost Function", the disclosures of which are herein incorporated by reference.

FIELD OF THE INVENTION

This invention pertains to digital imaging, and more particularly to a color transformation used in preparing a digital image for printing.

BACKGROUND OF THE INVENTION

For the purposes of the current invention, the term CIELAB refers to the prior art device independent color space (DICS) defined by the Commission Internationale De L'Eclairage (CIE). Those skilled in the art will recognize that the CIELAB color space is widely used in the fields of digital imaging and color gamut mapping. The use of the CIELAB color space throughout this document is meant to serve as an example device independent color space. However, many other well known device independent color spaces could be substituted for CIELAB.

A typical digital imaging system may include an image capture device such as a digital camera or scanner, a computer attached to the digital camera for processing the digital images, and a color output device such as a printer or softcopy display attached to the computer for printing/viewing the processed digital images. A color management architecture for a digital imaging system provides a means for processing the digital images in the computer such that the output colors that are produced on the output device are reasonable reproductions of the desired input colors as captured by the input device. One such color management architecture that is widely known and accepted in the art is defined by the International Color Consortium (ICC) in Specification ICC.1:2001-12 "File Format For Color Profiles". The ICC color management framework provides for characterizing an imaging device using a device profile such as an "ICC profile". The ICC profile for an imaging device specifies how to convert to/from device dependent color space (DDCS) from/to a device independent color space (DICS) so that images may be communicated from one device to another.

For example, images generated by a digital camera are generally composed of a 2-dimensional (x,y) array of discrete pixels, where each pixel is represented by a trio of 8-bit digital code values (which are integers in the range 0–255) that represent the amount of red, green, and blue color that were "seen" by the camera at this pixel. These RGB code values represent the DDCS, since they describe the amount of light that was captured through the specific set of RGB filters that are used in the digital camera. In order for this digital image to be used, the RGB code values must be transformed into a DICS so they may be properly interpreted by another imaging device. An example of a typical digital imaging system incorporating ICC color management is depicted in FIG. 1, in which a digital image source 10 provides RGB input code values (a DDCS) to a computer (not shown). The computer transforms the RGB input code values to a DICS (which is CIELAB in this case) using an input device color transform 20 specified by the ICC profile for the digital image source 10. Once converted to CIELAB, the image is then processed through an output device color transform 30, which is specified by an ICC profile for the output device. In this case, the output device is an inkjet printer 40 that uses cyan, yellow, magenta, and black (CMYK) colorants. Thus, the ICC profile for the inkjet printer 40 provides the transformation from the DICS (CIELAB) to the DDCS (CMYK) for the printer. The combination of the ICC profile transformations for the input and output devices ensures that the colors reproduced by the output device match those captured by the input device.

The ICC profile format, of course, simply provides a file format in which a color transform is stored. The color transform itself, which is typically encoded as a multidimensional look-up table, is what specifies the mathematical conversion from one color space to another. There are many tools known in the art (such as the commercially available Kodak ColorFlow Profile Editor) for creating ICC profiles for wide variety of imaging devices, including inkjet printers using CMYK colorants. CMYK printers in particular pose a challenge when creating a color transform. Since there are 4 colorants that are used to print a given color, which is specified in the DICS by 3 channels (e.g., CIELAB [$L^*$, $a^*$, $b^*$] coordinates), then there is an extra degree of freedom that results in a many-to-one mapping, where many CMYK code value combinations can result in the same color. Thus, when building the color transform, a method of choosing a particular CMYK combination that is used to reproduce a given color is required. Techniques to accomplish this (known in the graphic arts as Under Color Removal (UCR) or Black Generation (BG)) are known in the art, as taught in U.S. Pat. Nos. 4,482,917; 5,425,134; 5,508,827; 5,553,199; and 5,710,824. These methods primarily use smooth curves or interpolation techniques to specify the amount of black ink that is used to reproduce a color based on its location in color space, and then compute the amount of cyan, magenta, and yellow (CMY) ink that are need to accurately reproduce the color.

A given UCR or BG process controls both the mapping between DICS values and DDCS colorant control signal values and the form of the device color gamut boundary in the DICS. The device color gamut, in the DICS, defines the range of DICS values that are reproducible by the color imaging device. Color imaging devices with larger DICS gamuts are capable of producing a wider range of DICS values than devices with smaller DICS gamuts. The ICC color profile specification defines the range of all DICS values that may be represented in an output color profile. This range of DICS values is larger than the color gamut boundary of typical color imaging devices. As such, the regions of the DICS that are outside of the color gamut boundary of the color imaging device need to be mapped into the color gamut boundary of the output color imaging device. This process is commonly referred to in the art as color gamut mapping.

In order to perform a color gamut mapping operation in a DICS, a representation of the color imaging device's color gamut boundary is necessary. U.S. Pat. No. 5,721,572 teaches a process of generating a gamut surface descriptor (referred to herein as a color gamut boundary) that consists of color gamut boundary points and a set of a set of triangular facets. One such DICS color gamut boundary is shown in FIG. 2. Thus, DICS values that fall inside of this color gamut boundary are capable of being created by the output color imaging device, and DICS values that fall outside of this color gamut boundary are not capable of being created by the output color imaging device. The color gamut descriptor described by U.S. Pat. No. 5,721,572 defines the complete color gamut boundary for a three or four colorant color imaging device. The complete color gamut boundary is defined as one that encompasses all combinations of the colorants used by the output color imaging device. Thus, the complete color gamut boundary defines all possible DICS values producible by the device. It is important to realize the distinction between the complete color gamut boundary and the reduced color gamut boundary formed when UCR or BG strategies are utilized. Often, the UCR or BG strategy will limit the reduced color gamut boundary compared to the complete color gamut boundary by eliminating certain colorant combinations.

In the case of an inkjet printer, which places discrete drops of CMYK inks on a page, different combinations of CMYK code values may produce the same color, but appear much different in graininess or noise when viewed by a human observer. This is due to the fact that inkjet printers are typically multitone printers, which are capable of ejecting only a fixed number (generally 1–8) of discrete ink drop sizes at each pixel. The graininess of a multitoned image region will vary depending on the CMYK code values that were used to generate it. Thus, certain CMYK code value combinations might produce visible patterns having an undesirable grainy appearance, while other CMYK code value combinations may produce the same (or nearly the same) color, but not appear as grainy. This relationship is not recognized nor taken advantage of in the prior art techniques for generating color transforms for CMYK printers.

An additional complication with creating color transform for inkjet printers is that image artifacts can typically result from using too much ink. These image artifacts degrade the image quality, and can result in an unacceptable print. In the case of an inkjet printer, some examples of these image artifacts include bleeding, cockling, banding, and coalescence. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver may warp to such an extent as to interfere with the mechanical motions of the printer, potentially causing damage to the printer. Banding refers to unexpected dark or light lines or streaks that appear running across the print, generally oriented along one of the axes of motion of the printer. Coalescence refers to undesired density or tonal variations that arise when ink pools together on the page, and can give the print a grainy appearance, thus degrading the image quality. In an inkjet printer, satisfactory density, and color reproduction can generally be achieved without using the maximum possible amount of colorant. Therefore, using excessive colorant not only introduces the possibility of the above described image artifacts occurring, but is also a waste of colorant. This is disadvantageous, since the user will get fewer prints from a given quantity of colorant.

It has been recognized in the art that the use of excessive colorant when printing a digital image needs to be avoided. Generally, the amount of colorant needed to cause image artifacts (and therefore be considered excessive) is receiver, colorant, and printer technology dependent. Many techniques of reducing the colorant amount are known in the art, some of which operate on the image data after multitoning. See, for example, U.S. Pat. Nos. 4,930,018; 5,515,479; 5,563,985; 5,012,257; and 6,081,340. U.S. Pat. No. 5,633,662 to Allen et al. teaches a method of reducing colorant using a pre-multitoning algorithm that operates on higher bit precision data (typically 256 levels, or 8 bits per pixel, per color). Also, many of the commercially available ICC profile creation tools (such as Kodak ColorFlow Profile Editor) have controls that can be adjusted when creating the ICC profile that limit the amount of colorant that will be printed when using the ICC profile. This process is sometimes referred to as total colorant amount limiting.

The prior art techniques for total colorant amount limiting work well for many inkjet printers, but are disadvantaged when applied to state of the art inkjet printers that use other than the standard set of CMYK inks. A common trend in state of the art inkjet printing is to use CMYKcm inks, in which additional cyan and magenta inks (represented by the lowercase c and m in CMYKcm) that are lighter in density are used. The use of the light inks results in less visible ink dots in highlight regions, and therefore improved image quality. However, many tools for creating ICC profiles cannot be used to create a profile that directly addresses all 6 color channels of the inkjet printer, due to the complex mathematics involved. Instead, a CMYK profile is typically created, which is then followed by a look-up table that converts CMYK to CMYKcm. For example, see U.S. Pat. No. 6,312,101. While this and similar methods provide a way for current ICC profile generation tools to be used with CMYKcm printers, the amount of colorant that gets placed on the page as a function of the CMYK code value is typically highly non-linear and possibly non-monotonic as well. This creates a big problem for the prior art ICC profile generation tools, since they all assume that the amount of colorant that is printed is proportional to the CMYK code value. Thus, when building an ICC profile for a CMYKcm printer using prior art tools, the total colorant amount limiting is often quite inaccurate, resulting in poor image quality.

Since output color profiles are designed to accept as inputs DICS values over a larger range of values than are capable of being reproduced by the output color imaging device, a gamut mapping process is required. Many such gamut-mapping processes are known in the art. One common color gamut-mapping process is gamut clipping. This process involves taking an out-of-gamut DICS value and mapping it to the surface of the color imaging device gamut. Using this type of approach, all out-of-gamut DICS values will get reproduced using the DDCS values of combinations of points defined in the color gamut boundary. Based on the description of the color imaging artifacts described above, for inkjet and other multicolor imaging devices, different colorant combinations will lead to different ink volumes, perceived noise (graininess), and other imaging characteristics. Since it is desirable for all DICS (in-gamut and out-of-gamut) values to be produced with the optimal physical and visual characteristics, it is important to consider the DDCS values used to create a given DICS value for their imaging characteristics as described above.

In light of the above described image artifacts, there is the need for a reduced color gamut boundary used in preparing a digital image for a digital printer in which the amount of colorant, the noise (or graininess), and the color reproduction accuracy can be simultaneously adjusted by a user.

SUMMARY OF THE INVENTION

It is an object of the present invention to provide for printing high quality out-of-gamut colors that are free from the artifacts described above by creating a color gamut boundary that minimizes the image quality artifacts associated with out-of-gamut DICS values that are mapped onto the color gamut boundary.

It is a further object of the present invention to create a process for gamut mapping out-of-gamut DICS values to in-gamut DICS values that are on or inside a color gamut boundary that minimized the image quality artifacts associated with the selection of DDCS values for the gamut-mapped points.

These objects are achieved by a method of generating a reduced color gamut boundary for a color output device, the color output device producing output colors using three or more colorants, wherein the amount of each colorant is controlled by a colorant control signal vector, comprising the steps of:

a) determining a forward device model for the color output device relating the colorant control signal vector to the corresponding output color;

b) determining a complete color gamut boundary for the color output device, comprising a set of color gamut boundary points;

c) determining a set of candidate colorant control signal vectors for each point in the complete color gamut boundary;

d) selecting a preferred colorant control signal vector from the set of candidate colorant control signal vectors for each point in the complete color gamut boundary using a cost function responsive to one or more cost attribute(s) that vary as a function of the colorant control signal vector; and e) defining a reduced color gamut boundary comprising a set of output colors by using the forward device model to determine the output colors for each of the preferred colorant control signal vectors.

ADVANTAGES

By using a cost function to create a reduced color gamut boundary used in preparing a digital image for a digital printer in accordance with the present invention, high quality digital images that are free of the above mentioned artifacts are provided. The present invention provides a way of creating a color gamut boundary that simultaneously provides accurate color calibration and total colorant amount limiting for a digital printer, while minimizing the appearance of undesirable graininess or noise. The present invention provides for a substantial improvement over the prior art in that it provides these benefits for multilevel printers in which the colorant amount may not be linear or monotonic with digital code value.

DETAILED DESCRIPTION OF THE INVENTION

A method of generating a reduced color gamut and/or a color gamut mapping transform that provides for accurate total colorant amount limiting, pleasing color reproduction, and control over graininess represents an advancement in the state of the art. A preferred embodiment of the present invention achieving these goals will be described herein below. The invention will be described in the context of a color output device consisting of an inkjet printer using CMYK inks, but one skilled in the art will recognize that the scope of the invention is not limited to this arrangement, and may be applied to other colorant sets and/or other printing or display technologies as well.

Figure 1:
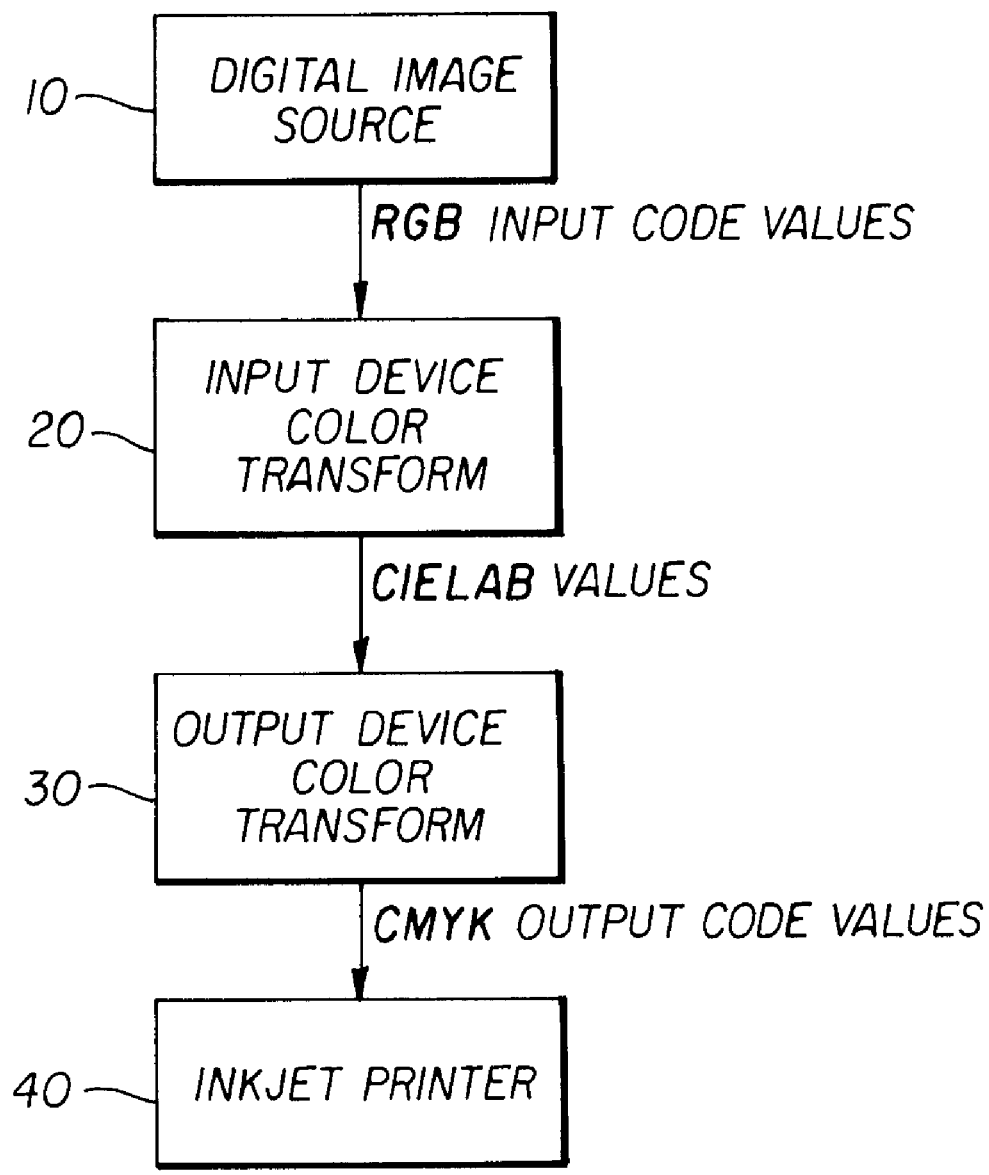
FIG. 1 is a block diagram showing a digital imaging system in accordance with the present invention.
Figure 2:
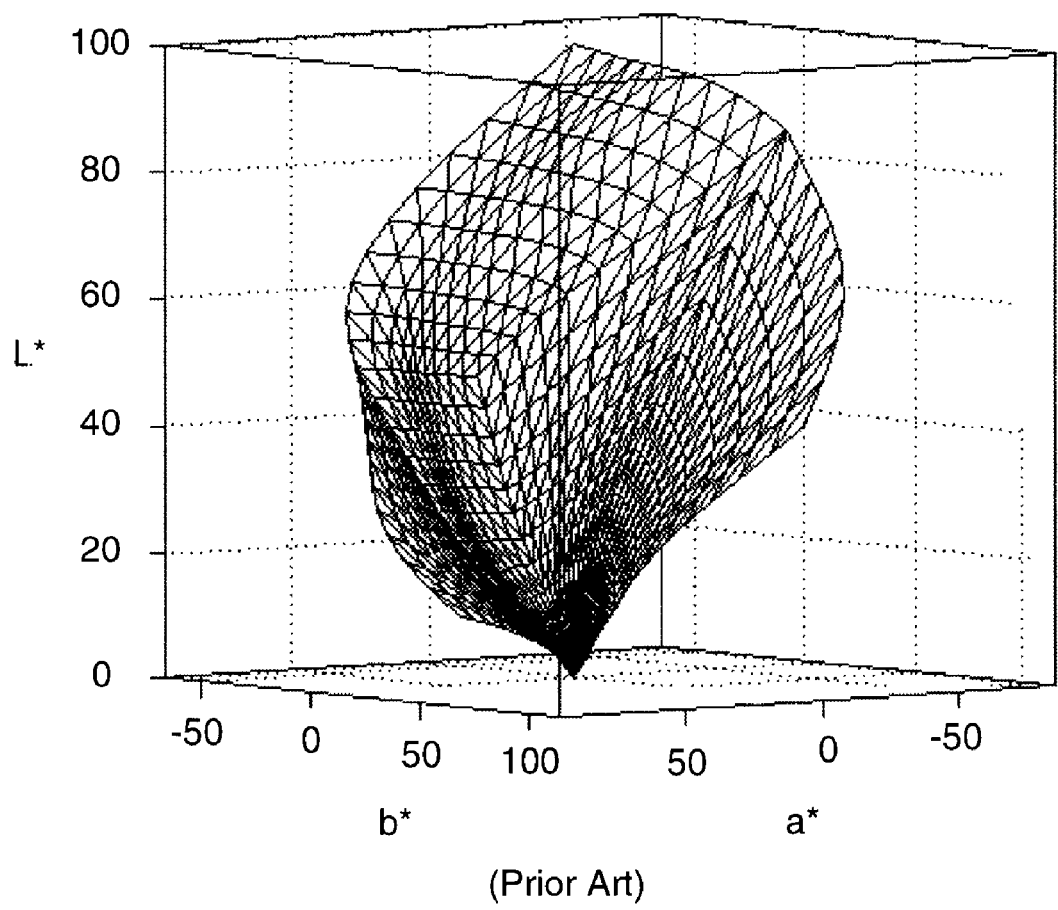
FIG. 2 is a color gamut boundary.
Figure 3:
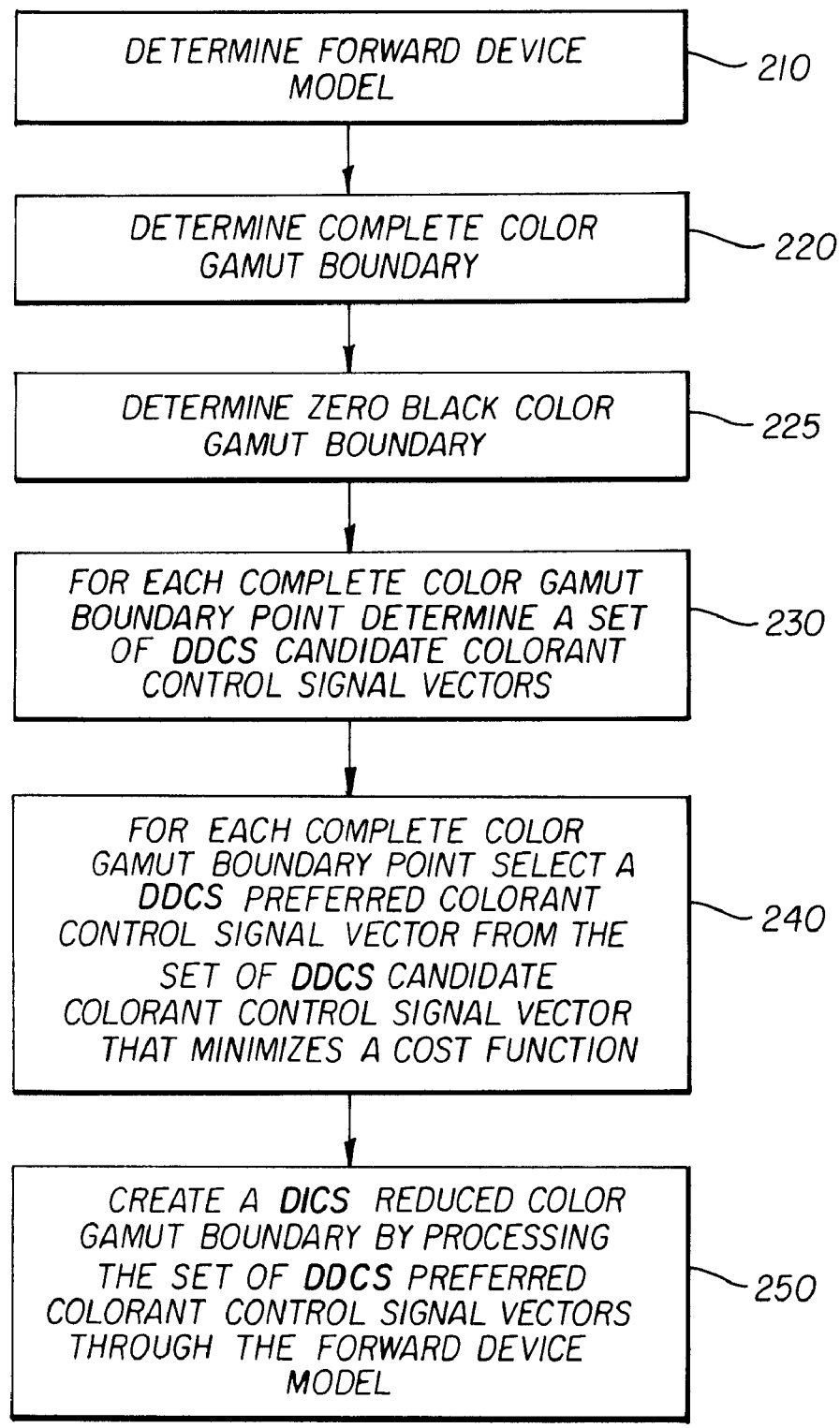
FIG. 3 is a block diagram showing the process of creating a reduced color gamut boundary.

Referring to FIG. 3, a process is detailed that produces a reduced color gamut boundary (gamut surface descriptor) for a CMYK color printing system that includes the step of first determining a forward device model for the color imaging device 210. There are many ways in which the forward device model may be created that are known to those skilled in the art. One way is to use the known spectral characteristics of the inks with color mixing equations to predict the output color without actually printing it. In a preferred embodiment, an image target consisting of a number of color patches substantially covering the full CMYK code value range is actually printed, and the CIELAB values for each color patch are measured. A multidimensional look-up table is then created from the CMYK code values and corresponding CIELAB values using multidimensional linear interpolation between the sampled data points as taught in U.S. Pat. No. 4,992,861. Again, it will be recognized by one skilled in the art that other processes exist for creating the forward device model 210 and that the present invention is not limited to the process taught in U.S. Pat. No. 4,992,861.

Still referring to FIG. 3, the forward device model 210 is used to determine a complete color gamut boundary 220. In a preferred embodiment of this invention, the complete color gamut boundary 220 is determined using the process taught in U.S. Pat. No. 5,721,572. It will be recognized by one skilled in the art that other processes exist for determining the complete color gamut boundary 220, and that the present invention is not limited to the process taught in U.S. Pat. No. 5,721,572. The complete color gamut boundary 220 defines the full gamut extent of the CMYK colorants used in the printing system outside of any constraints placed on the colorant combination amounts. Thus, the DDCS colorant control signal vectors are permitted to range between their minimum and maximum colorant values.

Still referring to FIG. 3, a DICS zero black color gamut boundary is determined in process 225 using the process given in U.S. Pat. No. 5,721,572. The DICS zero black color gamut boundary can be determined by processing a CMY grid of points, with the black channel (K) equal to zero, through the forward device model.

Figure 4:
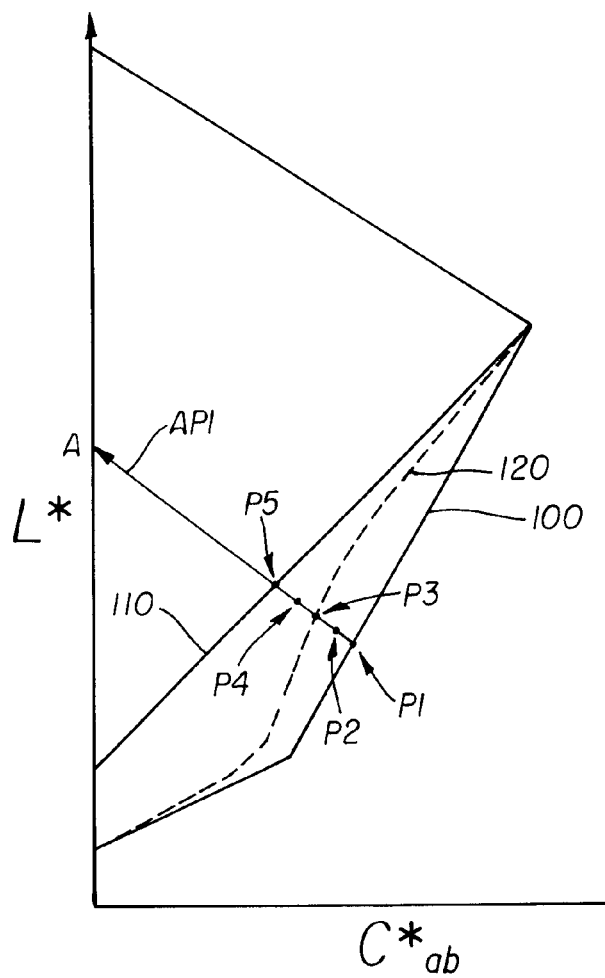
FIG. 4 is a geometric illustration of the process used to create a reduced color gamut boundary.

Still referring to FIG. 3, a process 230 is initiated to generate a set of DDCS candidate colorant control signal vectors for each point in the complete color gamut boundary that minimize the image structure artifacts described above. Referring to FIG. 4, an illustration of a DICS representation of the complete color gamut boundary 100 is shown for a single hue angle in the cylindrical CIELAB lightness (L*), chroma ($C^*_{ab}$), and hue ($h_{ab}$) DICS. This representation is recognized by one skilled in the art as a common procedure for illustrating a gamut mapping operation. It is also noted that illustrating the process using a constant hue angle ($h_{ab}$) slice through the complete color gamut boundary does not imply that this process is only valid for the case where hue preserving gamut mapping operations are performed. Similar illustrations could be presented for mappings that involve simultaneous changes in L*, $C^*_{ab}$, and $h_{ab}$, but they would be substantially more difficult to visualize. As such, the present illustrations suffice.

Still referring to FIG. 4, the process of determining a set of DDCS candidate colorant control signal vectors consists of first mapping the DICS points of the complete color gamut boundary into the gamut of the color imaging device by different amounts. One such complete color gamut boundary point is point P1. Point P1 is mapped along a direction defined by the direction vector (AP1) formed between points P1 and A. The location of point A can be varied depending on the application and the desired mapping strategy. In a preferred embodiment of this invention point A is a centrally located achromatic point (50,0,0) in the CIELAB DICS.

Still referring to FIG. 4, the DICS coordinates of point P5 are determined by mapping point P1 along the direction vector AP1 until the point intersects the zero black color gamut boundary 110. In a preferred embodiment of the present invention, points P1 and P5 define the end points of a search space used to identify candidate DDCS colorant control signals to create a reduced color gamut boundary that has optimal image structure characteristics.

Still referring to FIG. 4, several DICS points are identified between points P1 and P5 that fall along the direction vector AP1. For example purposes only, three intermediate points are shown as P2, P3, and P4. In a practice the number of DICS points identified between the endpoints P1 and P5 are on the order of five to twenty, but for illustration purposes only three intermediate points are shown. In a preferred embodiment of the present invention, the intermediate DICS points are positioned by equal spaces between point P1 and P5. In another embodiment, the number of intermediate DICS points to be evaluated between points P1 and P5 is determined based on the Euclidean distance between points P1 and P5 in the given DICS.

For a well-behaved CMYK printing device, point P1 can only be formed by a single CMYK colorant control signal vector. Point P5 may, however, be able to be formed by many CMYK colorant control signal vectors. By design, one of the CMYK colorant control signals that can be used to form the color represented at point P5 will have a black (K) colorant control signal value of zero. Thus, DICS points that fall along the path from point P1 to point P5 can be formed by a set of DDCS colorant control signals that decrease in their black (K) colorant control signal values from that of point P1 to zero at point P5. This is referred to as the minimum black solution and is taught in U.S. Pat. No. 5,553,199. Thus, in a preferred embodiment of the present invention, candidate DDCS colorant control signal vectors for DICS points P1–P5 are calculated using the process given in U.S. Pat. No. 5,553,199 for the minimum black solution. This minimum black solution provides a simple method for determining a unique inverse transformation from a given DICS value to a given DDCS colorant control signal vector that uses the minimum amount of the black (K) colorant control signal vector possible that still produces the requested DICS value.

Referring to FIG. 3, the process 240 of selecting a preferred colorant control signal vector to form a reduced color gamut boundary 120, as shown in FIG. 4, involves calculating a cost value for each candidate point (i.e., P1, P2, P3, P4, and P5). The cost value for each point is computed as described in commonly assigned U.S. patent application Ser. No. 10/309,866 filed concurrently herewith by Douglas W. Couwenhoven et al., entitled "Calibrating a Digital Printer Using a Cost Function", the disclosures of which are herein incorporated by reference, where the cost function is responsive to one or more cost attributes.

In some applications, it may be desirable to form a reduced color gamut boundary that minimizes image noise above all else, while in other applications, it may be desirable to use as little ink as possible, regardless of image noise. In still other applications it may be desirable to maximize the realized gamut volume above all else. It is likely that every application has a slightly different set of design criteria. The method of the present invention permits the user to satisfy any particular set of design criteria by employing a cost function based approach for selecting the preferred colorant control signal vector from the set of candidate DDCS colorant control signals vectors.

Referring to FIG. 3, the process 240 of the present invention is to select a point to form the reduced color gamut boundary 120, as shown in FIG. 4, by computing a cost value associated with each CMYK candidate colorant control signal vector using a cost function and selecting a preferred colorant control signal vector with minimum cost. These preferred colorant control signal vectors are used to form a DICS reduced color gamut boundary by processing them through the forward device model to produce DICS values 250. The DICS preferred color gamut boundary points and the triangular facets from complete color gamut boundary completely specify the reduced color gamut boundary.

Figure 5:
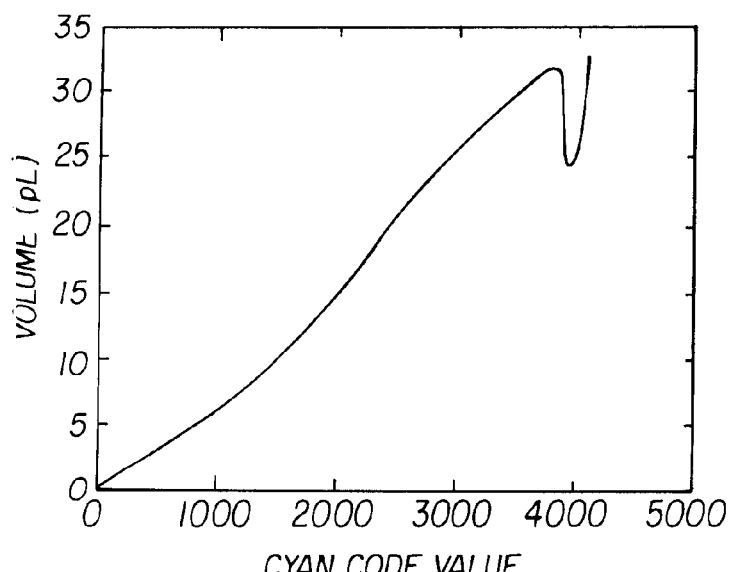
FIG. 5 is a graph showing ink volume as a function of code value.

The cost function includes terms for many cost attributes, relating to many different design characteristics. For example, using too much colorant can result in undesirable artifacts, as described above. Thus, the cost function includes a term that penalizes CMYK colorant control signals combinations using higher amounts of ink volume. The ink volume is computed using a volume model, which predicts the ink volume as a function of the CMYK code values. For many printers, the volume model can be analytically expressed as an equation, given some knowledge about the specifications of the printer, such as the number of ink drop sizes that can be ejected at each pixel, and their associated volumes. For example, in the simple case of a binary CMYK printer with a fixed drop volume of 32 picoliters, the volume produced by a given CMYK code value combination will vary linearly with the sum of the CMYK code values. However, state of the art inkjet printers can have highly non-linear and/or non-monotonic ink volume curves as a function of the CMYK code value. An example of such a curve is shown in FIG. 5, which was derived from the C (cyan) data channel of a Kodak Professional 3062 Large Format Inkjet printer. This curve has a complex shape due to the fact that two cyan inks (light and dark density) are being used to print the information in the C data channel. In this case, the volume produced by the C channel is computed using a one-dimensional (1D) look-up table that stores the volume curve of FIG. 5. Similar 1D look-up tables are constructed for the M, Y, and K channels, and the total volume is computed as the sum of the volumes of the individual CMYK channels according to $$V_{total}(C, M, Y, K) = VLUT_C(C) + VLUT_M(M) + VLUT_Y(Y) + VLUT_K(K).$$

Figure 6:
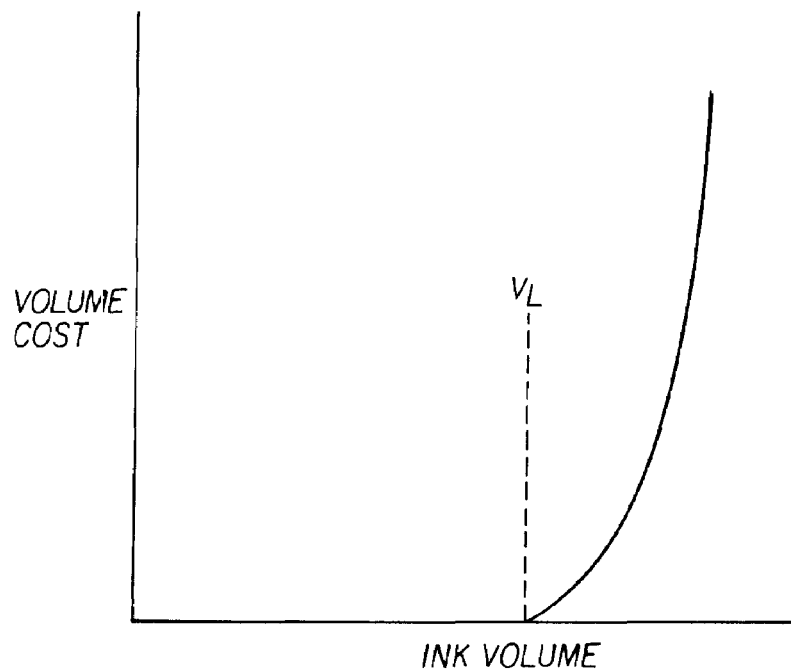
FIG. 6 is a graph showing a volume cost as a function of ink volume.

Once the total volume has been computed, a volume cost $V_{cost}(C, M, Y, K)$ is computed using a volume cost function similar to that shown in FIG. 6. If the total volume is below a threshold, $V_L$, then there is no cost associated with the corresponding CMYK code value combination. If the total volume exceeds the threshold $V_L$, then the volume cost increases rapidly. This will discourage the use of CMYK code value combinations that exceed the volume limit $V_L$, resulting in improved image quality. One skilled in the art will recognize that the volume cost function of FIG. 6 is just one such curve, and other curves may be used to provide similar effect.

Referring to process 240 in FIG. 3, in addition to a cost attribute related to the total ink volume, another important cost attribute is related to the image noise that is produced by each candidate CMYK code value combination. It is known in the art that different CMYK colorant control signal vectors result in different halftone patterns that could potentially result in different perceptions of "graininess" or "noise" when viewed by a human observer. Advantageously, the present invention defines a reduced color gamut boundary that trades chroma for reduced "graininess" or "noise" when viewed by a human observer. According to the present invention, the noise associated with each CMYK colorant control signal vector combination is used as a cost attribute to aid in the selection of a preferred CMYK colorant control signal vector to form the reduced color gamut boundary. Techniques for measuring the perception of noise in printed images are known in the art. Many similar variations exist that use a weighted sum of the image power spectrum as a measure of the noise in an image. In a preferred embodiment, the following equation is used to calculate an image noise metric representing the amount of noise in an image $$N = \log\left(\frac{1}{(n_x n_y)} \sum_u \sum_v |I(u,v) CSF(u,v)|^2\right)$$

where $(n_x, n_y)$ are the dimensions of the image region, $I(u,v)$ is the 2D Fourier transform of an image region $I(x,y)$, and $CSF(u,v)$ is the contrast sensitivity function of the human visual system, which can be computed according to the equations described in U.S. Pat. No. 5,822,451. The image region $I(x,y)$ corresponds to the halftone patterns that result from printing a given CMYK code value combination. An image noise model $N(C, M, Y, K)$ is then generated using the above equation to compute image noise for a set of printed color patches substantially covering the full CMYK code value range. In fact, the same set of color patches may be used to develop the forward device model and noise model, although this is not necessarily the case. Once the noise model $N(C, M, Y, K)$ has been generated, a noise cost can be computed for each of the candidate CMYK code value combinations according to $$N_{cost}(C, M, Y, K) = N(C, M, Y, K).$$

Another important cost attribute that is relevant for the construction of a reduced color gamut boundary from the complete color gamut boundary is the Euclidean color difference between points P1 and P5. For some applications it may be more important to maintain as much color gamut as possible. By moving the complete color gamut boundary value from P1 to P5, some of the chromatic range device is compromised. Thus, a trade off exists between chromatic dynamic range and perceived noise, making the Euclidean color difference between points P1 and P5 an important cost parameter. In a preferred embodiment of the present invention, a colorimetric cost term ($\Delta Eab_{cost}$) is defined by a function (F) that is responsive to input DICS Euclidean color differences between a given point P and the point P1 given by $$\Delta Eab_{cost} = F(P, P1)$$

where P is any one of the candidate DICS points for the reduced color gamut boundary identified in process 230.

Other cost attributes may be computed as required by the specific application. For example, certain CMYK code value combinations may provide improved resistance to light fading (or "lightfastness") when compared to other CMYK code value combinations. Thus, a term may be added to the cost function to penalize CMYK code value combinations that are prone to fading, thereby discouraging their use. Another term that may optionally be used in the cost function is a cost attribute related to "waterfastness", or the resistance of a CMYK code value combination to smearing when wetted. Also, certain CMYK code value combinations may provide for accurate color matching under a wide variety of illuminants, while others may only provide an accurate color match to the desired output color under a specific illuminant. This property is called the "metameric index" of the CMYK code value combination, and more robust CMYK code value combinations may be assigned a lower cost than less robust ones. Another term that may be used in the cost function relates to the surface gloss produced by a CMYK code value combination. For example, some inkjet printers use different formulations for the black (K) ink than are used for the CMY inks. The different formulations may have different gloss properties, causing an abrupt gloss change, or "differential gloss" when printing smooth gradations. These gloss changes are undesirable, and thus CMYK code value combinations prone to differential gloss may be penalized via a cost function term. One example of this would be to create a cost attribute in which the cost increases with the amount of black (K) ink used. One skilled in the art will recognize that there are other cost attributes that may be used, depending on the specific requirements of the application.

Figure 7:
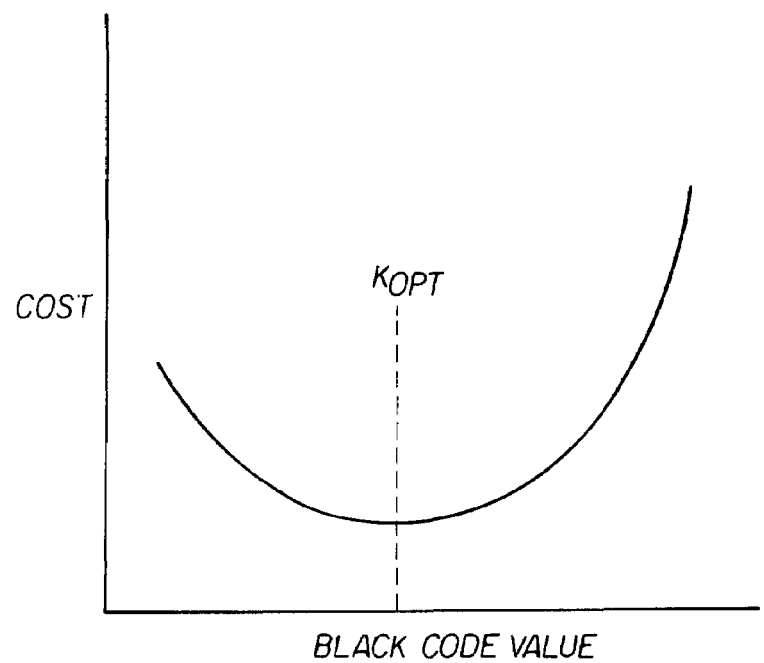
FIG. 7 is a graph showing a cost plotted as a function of the black ink code value.

Once all of the cost attributes have been computed, the total cost for a CMYK code value combination is computed by summing up all of the terms in the cost function. In a preferred embodiment, the total cost will include at least a volume cost term, a noise cost term, and a colorimetric cost term according to $$\text{Cost}(C, M, Y, K) = \alpha V_{cos\,t}(C, M, Y, K) + \beta N_{cos\,t}(C, M, Y, K) + \gamma \Delta Eab_{cost}(P, P5)$$

where the weights $\alpha$, $\beta$, and $\gamma$ may be adjusted to indicate the relative importance of volume, noise, and gamut loss in the image. Thus, the CMYK preferred colorant control signal vector to reproduce a desired output color is chosen as the one that minimizes the cost, as depicted in FIG. 7. A convenient way to organize the CMYK candidate colorant control signal vectors combinations is to sort them by the black (K) code value. FIG. 7 shows (for one desired output color) the cost of each CMYK candidate colorant control signal vector combination plotted against the black ink code value. The CMYK preferred colorant control signal vector combination has a black (K) value of $K_{opt}$, which corresponds to the minimum of the cost function.

Figure 8:
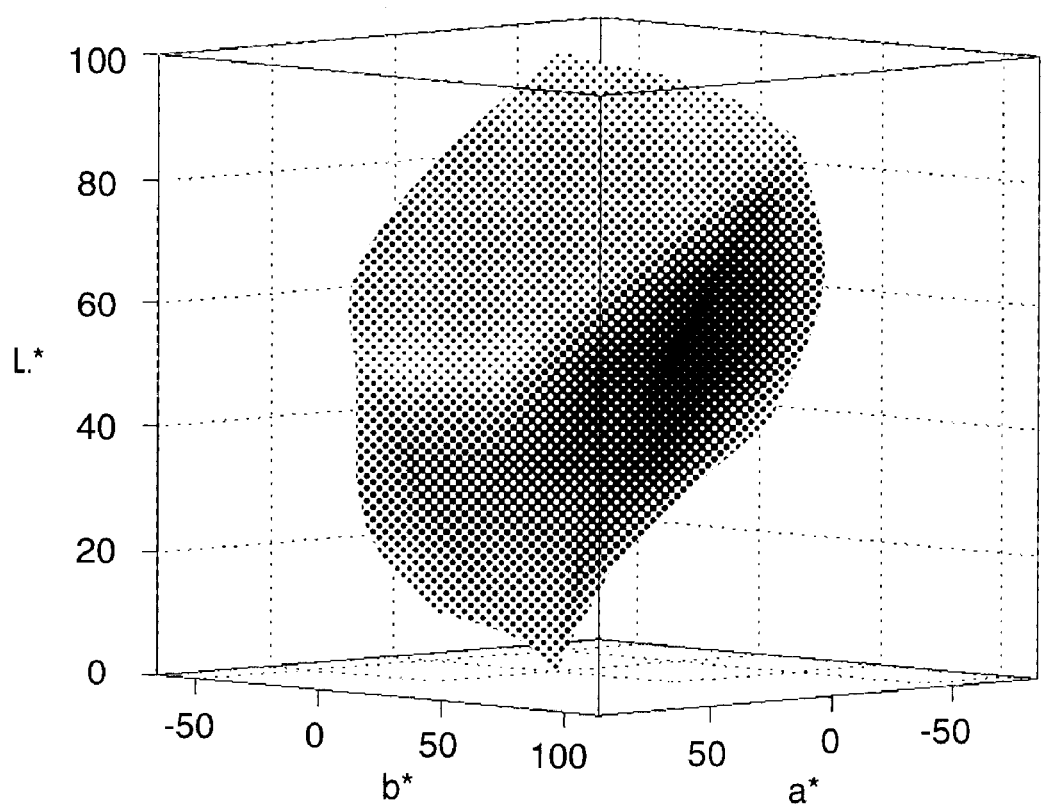
FIG. 8 is an example of a complete color gamut boundary for a CMYKcm inkjet printer.

An example complete color gamut boundary is shown in FIG. 8. The shading of the points on the surface of this color gamut boundary is inversely proportional to noise cost. Thus, higher noise cost is represented by darker color. Still referring to FIG. 8, the noise cost of points on the gamut surface varies depending on position. This is illustrated by the different shades on the gamut surface. In the case of the complete color gamut boundary shown in FIG. 8 some points are significantly noisier than others as indicated by their darker reproduction.

Figure 9:
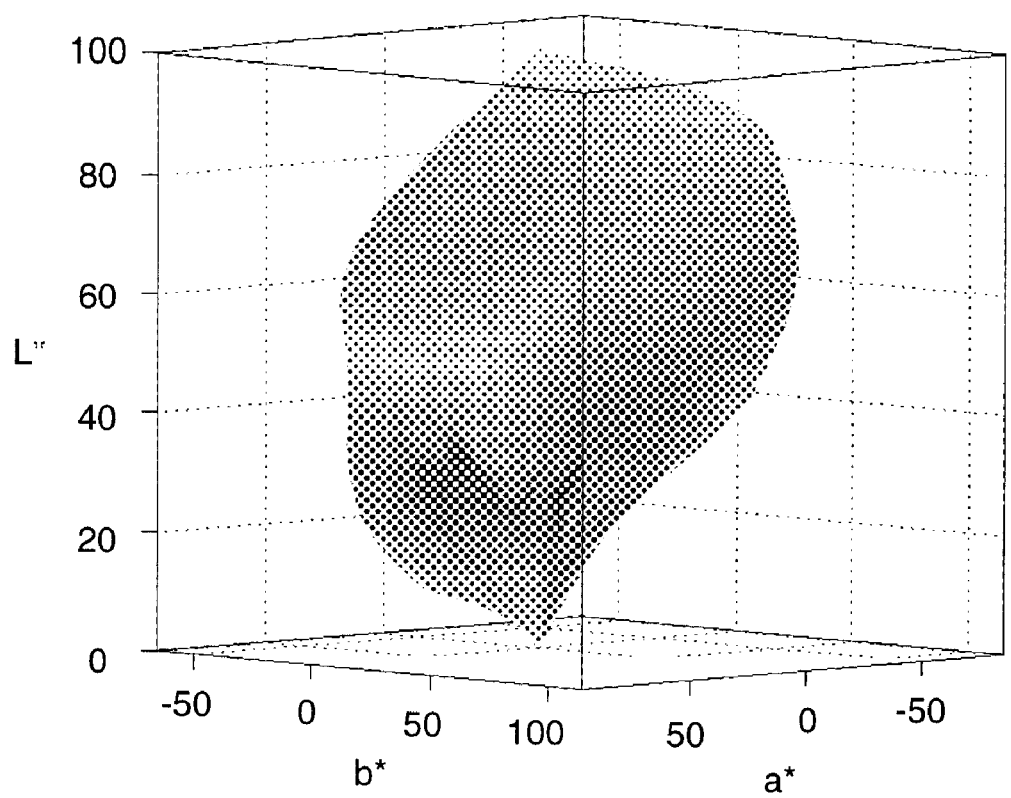
FIG. 9 is an example of a reduced color gamut boundary for the same CMYKcm printer shown in FIG. 8.

Referring to FIG. 9, an example reduced color gamut boundary created according to the present invention is shown. This reduced color gamut boundary was generated by minimizing a cost function that had volume, noise, and colorimetric cost terms as previously described. The shading of the points on the surface of this color gamut boundary is inversely proportional to noise cost. Thus, higher noise cost is represented by darker color. The resulting noise cost of the reduced color gamut boundary is less than or equal to that of the complete color gamut boundary shown in FIG. 8. Referring to FIG. 9, this is evidenced by the fact that there are less regions with very dark shading on the reduced color gamut boundary compared to the complete color gamut boundary.

To construct a color transform suitable for incorporating into an ICC profile a multidimensional lattice of desired output colors spanning the range of the CIELAB DICS defined by the ICC is defined. Some of these lattice points fall within the reduced color gamut boundary and some lattice points fall outside of the reduced color gamut boundary. In a preferred embodiment of this invention a gamut-mapping algorithm is used to map the out-of-gamut lattice points into/onto the surface described by the reduced color gamut boundary. One simple gamut mapping technique is to move an out-of-gamut color along a line in CIELAB space between it and a central point such as [L*a*b*]=(50,0,0). The intersection of the reduced color gamut boundary with the line is the in-gamut color that will be used to reproduce the out-of-gamut color. There are many other gamut mapping algorithms that are known to those skilled in the art, some of which are complex and sophisticated, and the particular form of gamut mapping is not fundamental to this invention.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 10 | digital image source |
| 20 | input device color transform |
| 30 | output device color transform |
| 40 | inkjet printer |
| 100 | complete color gamut boundary slice for a hue angle ($h_{ab}$) |
| 110 | zero black color gamut boundary for a hue angle ($h_{ab}$) |
| 120 | reduced color gamut boundary slice for a hue angle ($h_{ab}$) |
| 210 | process for determining a forward device model or color imaging device |
| 220 | process for determining a complete color gamut boundary |
| 225 | process for determining a zero black color gamut boundary |
| 230 | process for generating a set of candidate colorant control signal vectors for points in the complete color gamut boundary |
| 240 | process for selecting a preferred colorant control signal vector from the set of candidate colorant control signal vectors for points in the complete color gamut boundary to form a reduced color gamut boundary |
| 250 | process for creating a reduced color gamut boundary from the preferred colorant control signal vectors |
| A | centrally located achromatic point |
| AP1 | direction vector |
| P1 | complete color gamut boundary point |
| P2 | first intermediate point between points P1 and P5 |
| P3 | second intermediate point between points P1 and P5 |
| P4 | third intermediate point between points P1 and P5 |
| P5 | intersection point of direction vector AP1 and 110 |

What is claimed is:

1. A method of generating a reduced color gamut boundary for a color output device, the color output device producing output colors using three or more colorants, wherein the amount of each colorant is controlled by a colorant control signal vector, comprising the steps of:

a) determining a forward device model for the color output device relating the colorant control signal vector to the corresponding output color;

b) determining a complete color gamut boundary for the color output device, comprising a set of color gamut boundary points;

c) determining a set of candidate colorant control signal vectors for each point in the complete color gamut boundary;

d) selecting a preferred colorant control signal vector from the set of candidate colorant control signal vectors for each point in the complete color gamut boundary using a cost function responsive to one or more cost attribute(s) that vary as a function of the colorant control signal vector; and e) defining a reduced color gamut boundary comprising a set of output colors by using the forward device model to determine the output colors for each of the preferred colorant control signal vectors.

2. The method of claim 1 wherein step a) includes producing a set of color patches corresponding to a set of colorant control signal vectors and measuring the output color of each color patch.

3. The method of claim 1 wherein the color output device uses at least cyan, magenta, yellow, and black colorants.

4. The method of claim 1 wherein one of the cost attributes is a total colorant amount.

5. The method of claim 1 wherein one of the cost attributes is a colorimetric cost term.

6. The method of claim 1 wherein one of the cost attributes is an image noise metric.

7. The method of claim 6 wherein the image noise metric is determined from an image noise model that relates the colorant control signal vector to the corresponding image noise metric.

8. The method of claim 7 wherein the image noise model is formed by producing a set of color patches corresponding to a set of colorant control signal vectors and measuring the image noise metric of each color patch.

9. The method of claim 1 wherein one of the cost attributes is a function of the amount of an individual colorant.

10. The method of claim 9 wherein the cost attribute increases with the amount of a black colorant.

11. The method of claim 1 wherein one of the cost attributes is a metameric index.

12. The method of claim 1 wherein one of the cost attributes is a surface gloss value.

13. The method of claim 1 wherein one of the cost attributes is a waterfastness value.

14. The method of claim 1 wherein one of the cost attributes is a lightfastness value.

15. The method of claim 1 further including the step of using the reduced color gamut boundary, together with a gamut-mapping algorithm, to process colors outside of the reduced color gamut boundary to determine corresponding gamut-mapped colors that lie on or inside the reduced color gamut boundary.

16. A computer storage product having at least one computer storage medium having instructions stored therein causing one or more computers to perform the method of claim 1.

* * * * *